United States Patent [19]
Waehner

[11] 3,916,286
[45] Oct. 28, 1975

[54] SWITCHING POWER SUPPLY COMMON OUTPUT FILTER

[75] Inventor: Glenn C. Waehner, Riverside, Conn.
[73] Assignee: United Technologies Corporation, Hartford, Conn.
[22] Filed: Sept. 19, 1974
[21] Appl. No.: 507,648

[52] U.S. Cl. .................... 321/10; 321/2; 321/27 R; 321/47
[51] Int. Cl.² .......................................... H02M 1/14
[58] Field of Search ................. 321/2, 10, 27 R, 47; 333/79

[56] References Cited
UNITED STATES PATENTS

| | | | |
|---|---|---|---|
| 2,418,114 | 4/1947 | Frankel | 333/79 |
| 3,621,361 | 10/1970 | Barth | 321/10 |
| 3,657,631 | 4/1972 | Martens et al. | 321/2 |
| 3,745,440 | 2/1972 | Lord | 321/2 |

Primary Examiner—William M. Shoop
Attorney, Agent, or Firm—M. P. Williams

[57] ABSTRACT

In a low voltage power supply, a plurality of different low voltage outputs are provided at different voltage magnitudes, the series choke of each of the output is wound on the same ferromagnetic structure (core), the number of turns in the choke of each output being different and related to the number of turns in the choke of the other outputs in the same ratio as the relationship of their voltage magnitudes, thereby to provide the same volts per turn on each of the choke windings on the common core. In a second embodiment, only some of the output chokes are driven by rectifiers fed by the transformer secondary, the remaining supplies being driven by means of transformer action through the filter chokes themselves.

5 Claims, 3 Drawing Figures

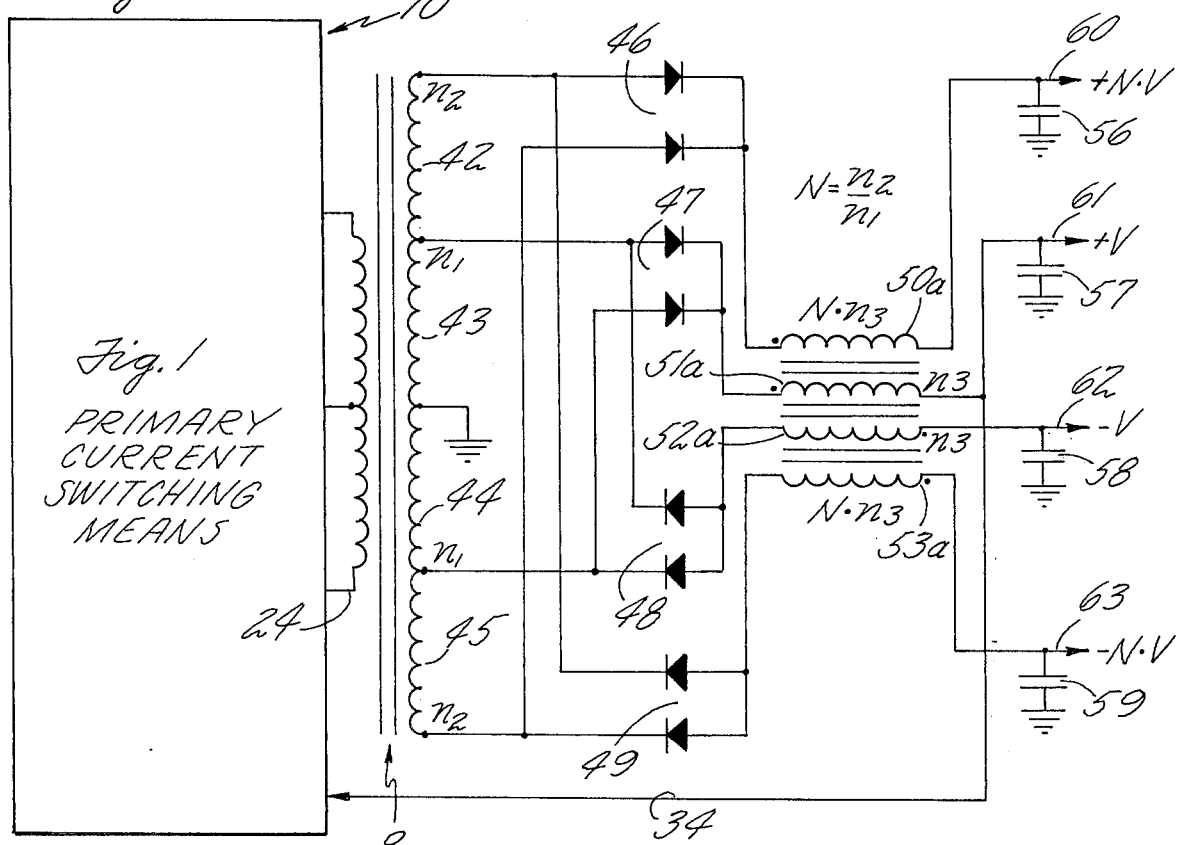
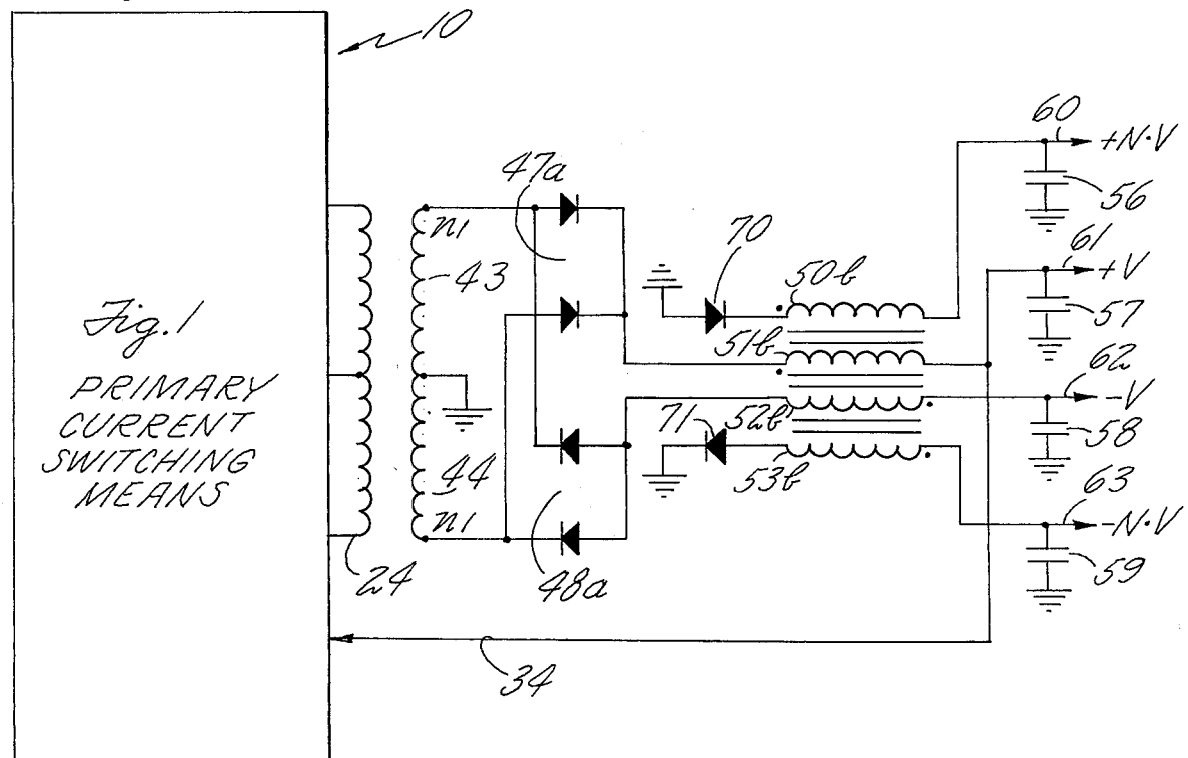

SWITCHING POWER SUPPLY COMMON OUTPUT FILTER

BACKGROUND OF THE INVENTION

1. Field of Invention

This invention relates to switching power supplies, and more particularly to improvements in multi-output power supplies.

2. Description of the Prior Art

A known type of high frequency, switching, low voltage power supply utilizes a DC voltage rectified directly from AC lines (such as 115V, 60Hz) applied across transistors in a common emitter configuration and a center tap of a transformer primary. The transistors are turned on and off so as to pulsewidth modulate the current through the primary in response to feedback error of the low voltage power supply output. For multiple low voltage outputs, more turns are required in the secondary, more rectifiers are required, and each rectifier set is provided with a low pass output filter, typically comprising a series inductor and shunt capacitor. Voltage regulation may be provided simply by monitoring the output voltage of one of the low voltage outputs, the other low voltage outputs tracking to the one within a few percent. However, a major portion of the power supply bulk, weight and expense is due to the output filter chokes. To supply proper DC voltage with no more than tolerable ripple thereon, each of the filter chokes requires a ferromagnetic (iron) core in order to have a high inductive value. Therefore, even though multiple outputs may be provided with a single reference voltage comparing only one of the outputs, and the resultant error controlling the modulation of transformer primary switching by a single means, such supplies still have an excess of bulk, weight and cost due to the need of iron cores in the output chokes.

SUMMARY OF THE INVENTION

An object of the present invention is to provide improvements in low voltage switching power supplies having multiple outputs, particularly in the cost, weight and size in the filter chokes thereof.

According to the present invention, a low voltage switching power supply having a plurality of different low voltage outputs includes a series filter choke for each of the outputs, each of said chokes comprising separate windings on a single magnetic core, the separate windings on the common core each have a number of turns which relates to the number of turns of the other windings in the same ratio as the voltage of the related output relates to the voltage of the other outputs.

In accordance with another aspect of the present invention, less than all of the low voltage outputs of a switching power supply are driven by the secondary of the modulated-primary power transformer, some of the outputs being driven through the common core by the filter chokes of other outputs.

The present invention permits savings on the order of 50% of core material required for output filter chokes, and permits savings on the order of a third of the total weight required for output filter chokes, including the windings thereof. The invention permits, through the coupling of filter chokes wound on a common core, reduction of the size of shunt filter capacitors in the different outputs of a multi-output low voltage power supply.

Other objects, features and advantages of the present invention will become more apparent in the light of the following detailed description of the preferred embodiments thereof, as illustrated in the accompanying drawing.

BRIEF DESCRIPTION OF THE DRAWING

FIG. 2 is a simplified schematic diagram of a first embodiment of the present invention; and FIG. 3 is a simplified schematic diagram of a second embodiment of the invention.

DESCRIPTION OF THE PREFERRED EMBODIMENT

Figure 1:
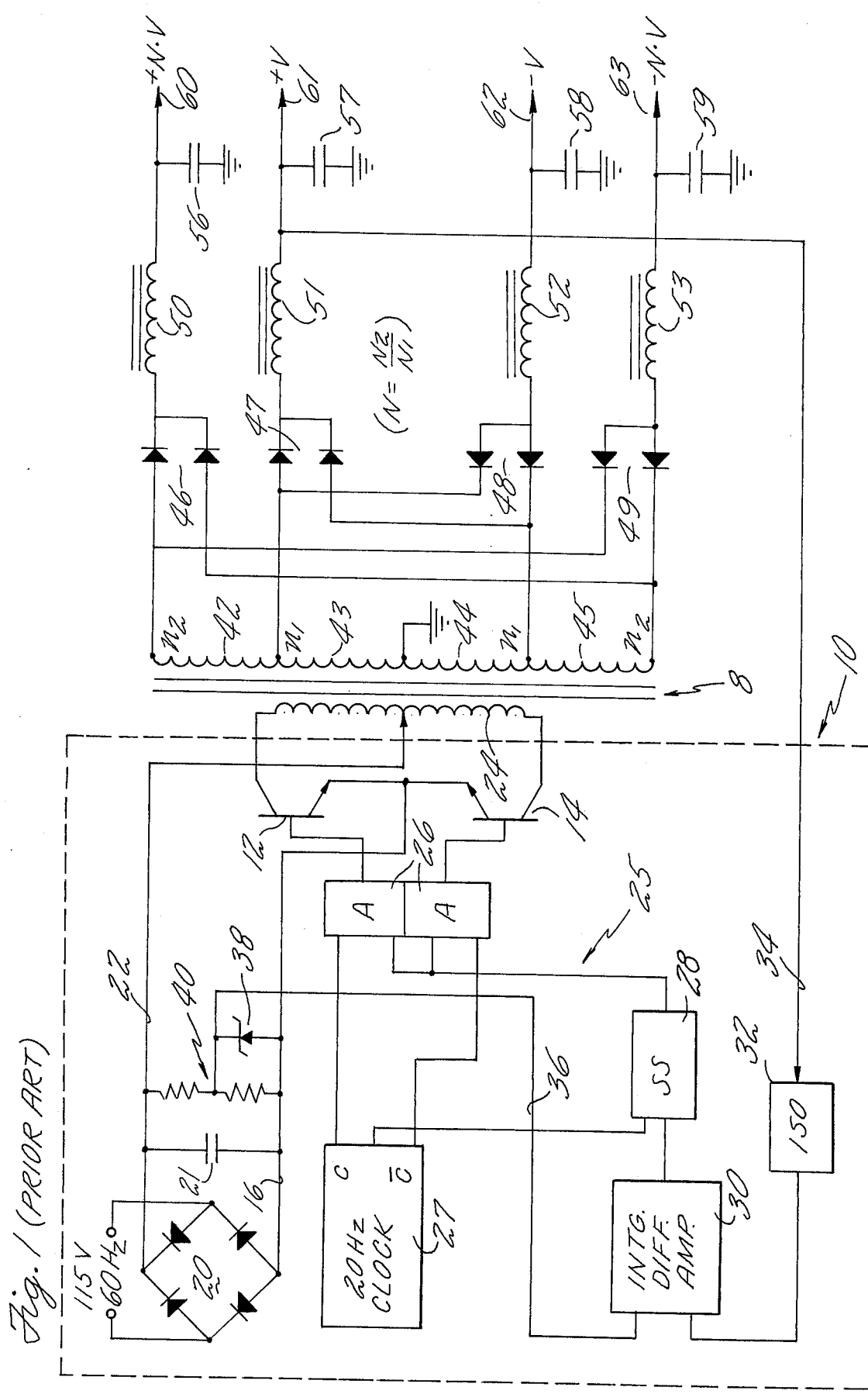
FIG. 1 is a schematic block diagram of a multi-output switching power supply known to the prior art.

A known type of pulsewidth modulated, high efficiency switching power supply, having multiple outputs, is illustrated in FIG. 1. Therein, the primary of a power transformer 8 is driven in alternate directions by primary current modulation means 10, which means includes a pair of power transistors 12, 14 connected in common emitter configuration to the negative line 16 of a DC power supply which may consist of a diode bridge 20 driven by a suitable power line, such as 115V, 60Hz. A filter capacitor 21 is connected between a positive line 22 of the power supply and the negative line 16. The positive line is connected to the center tap of the primary 24 of the transformer 8. Commutation drive circuitry 25, which may be of any type well known in the art, the detail of which forms no part of the present invention, is utilized to alternately drive one of the transistors 12, 14 to saturation, so that current flows alternatively to the upper and lower halves of the primary from the positive line 22 to the negative line 16. The amount of average current applied to the primary is controlled by the duty cycle (the portion of time in which the transistors 12, 14 are caused to conduct by the commutation drive circuitry 25). This may in turn be responsive to a pair of AND circuits 26 alternately enabled by opposite outputs ($c, \bar{c}$) of a clock circuit 27 (that establishes the frequency of operation). Either of the AND circuits 26 is turned on, when enabled, by the output of a single-shot 28, which is triggered by the clock 27 once for either output thereof, and the on-time of which is a function of the voltage input thereto. This input is fed by an integrating difference amplifier 30 connected through an isolator 32, such as an optical isolator (if necessary, due to separate ground potential), to the output voltage by a line 34, and also fed a reference potential on a line 36, to regulate the duty cycle of current in the transformer primary 34 in order to maintain the output voltage on the line 34 within desirable limits. The voltage reference on the line 36 may be supplied by any suitable voltage reference source, which may take the form of a Zener diode 38 connected across a portion of a resistor voltage divider 40 which may be powered across the lines 22, 16.

The secondary of the transformer 8 is provided with three taps so as to divide it into four segments 42–45. The segment 43 and the segment 44 each have $n_1$ turns; the segments 42 and 43 together, as well as the segments 44 and 45 together have $n_2$ turns. The number of turns in the segments is what will determine the various voltage outputs +V, −V, +N·V, and −N·V, wherein N is the ratio of turns $n_2$ to turns $n_1$. The transformer secondary segments 42–45 are connected for full wave, rectification to a plurality of rectifiers 46–49. The rectifiers 46, 47 are poled so as to provide positive current through respective series-connected filter chokes 50, 51, and the rectifiers 48, 49 are poled to supply negative current to respective series-connected filter chokes 52, 53. Each of the outputs is provided with a corresponding shunt-connected filter capacitor 56–59, the chokes 50–53 and condensers 56–59 serving to filter the ripple out of the output voltage appearing at the respective outputs 60–63.

The circuit of FIG. 1 is known, and it is known that by causing the frequency of operation of the pulsewidth modulation circuit 28 to be on the order of 20kHz, the ripple at the outputs 60–63 can be kept quite small. However, there is still a need for significant inductance in each of the filter chokes 50–53, which therefore requires the use of ferromagnetic cores in each of the chokes. Thus, although the circuitry 10 can be made to accommodate numerous outputs of different voltage ratings (such as the four outputs illustrated in FIG. 1), the bulk of the weight and cost, resulting from the filter chokes, corresponds individually to the number of outputs which are required.

A first embodiment of the invention, as illlustrated in FIG. 2, is identical to the circuit described with respect to FIG. 1 with the exception of the fact that each of the choke windings 50a–53a is wound on a common core, the windings being provided with numbers of turns which relate to the other windings in the same fashion as the voltage of the corresponding output relates to the voltage of the other corresponding outputs, which in turns is the same as the ratio of the total number of turns of the secondary winding driving the rectifiers of the given output. Thus, if $n_2$ equals twice $n_1$, and the circuit is designed to provide a voltage +V of 10 volts at the output 61, then the voltage +N·V at the output 60 would be 20 volts, and the choke winding 50a would have twice as many turns as the choke winding 51a. The choke winding 52a would have the same number of turns as the choke winding 51a, and the choke winding 53a would have twice as many turns as the choke winding 51a. Note that all of the AC voltage supplied by the $n_1$ or $n_2$ turns of the secondary is dropped across the related choke. The chokes 52a, 53a are wound on the core in opposite sense (according to the well known dot notation) to the coils 50a, 51a. This is so that the current flow through each of the choke windings has the same effect on flux in the core (in terms of sense of direction).

Thus, according to the present invention, it has been found that utilization of a common core for the filter chokes of the different-voltage outputs of a multiple-output power supply is possible, provided that each of the windings have the same volts per turn; this is achieved by having the turns of one choke at the same ratio to the turns of the other chokes as their primary applied voltages relate to each other. In this fashion, there is no tendency for one choke to drive the other, or concomitantly, for one choke to load the other. However, there is an advantage in addition to saving of ferromagnetic material, which results from the AC coupling between the various windings. That is, each of the filter capacitors can be roughly half the size that would otherwise be required since any temporary serge on one of the output lines is AC coupled through the core to the other lines and tends to draw current therefrom. If the coefficient of coupling were perfect (100%) between the choke windings, then only one of the outputs would be required to have a filter capacitor, since it would be completely AC coupled to the other outupts through the mutual inductance of the choke windings. However, in practice, there is leakage inductance in any practical structure, so the coupling is not complete and capacitors are required on each line.

Another embodiment of the invention is illustrated in FIG. 3. Therein, only two segments of transformer secondary 43, 44 and two sets of rectifiers 47a, 48a are utilized. These feed chokes 51b, 52b provide rectified and filtered current to the outputs 61, 62 in the same fashion as in the embodiment of FIG. 2. However, a pair of choke windings 50b, 53b are provided with only a single rectifier 70, 71, and these are driven as secondaries of a transformer in which the primaries compromise the filter chokes 51b, 52b. It may be necessary that the secondary segments 43, 44 and the rectifiers 47a, 48a have increased power capacity in order to drive the additional load including the outputs 60, 63. Also, the embodiment of FIG. 3 will actually operate even though one output 61, 62 is not drawing current, since these outputs are at AC ground due to the filter condensers 57, 58, and loads in the outputs 60, 63 will be coupled through the common core from the windings 50b, 53b to one winding 51b, 52b. However, the embodiment of FIG. 3 does not represent a significant saving over the embodiment of FIG. 2, representing a single rectifier and a single transformer secondary segment per output, in contrast with the considerable saving that the invention provides in both the embodiments of FIGS. 2 and 3 in contrast with the prior art as shown in FIG. 1. Due to the imperfect coupling (the coefficient coupling being less than one) in the common core output chokes 50b–53b, the embodiment of FIG. 3 offers somewhat poorer voltage/current regulation characteristics in contrast with the embodiment of FIG. 2.

The present invention may be employed in high efficiency switching power supplies of types known in the art, simply by substituting a common-core set of filtered chokes for the individual filter chokes presently employed. However, greatest advantage is taken of the invention if the size of the filter capacitors is also reduced. And where the power supply is less critical, the embodiment of FIG. 3 may be utilized eliminating additional turns and rectifiers.

Although the invention has been shown and described with respect to preferred embodiments thereof, it should be understood by those skilled in the art that the foregoing and various other changes, omissions, and additions thereto may be made therein without departing from the spirit and the scope of the invention.

Having thus described typical embodiments of my invention, that which I claim as new and desire to secure by Letters Patent is:

1. In a switching power supply of the type having a power transformer including a primary winding and a multitap secondary winding, drive means for driving the primary of the transformer with currents of alternate polarity, rectifiers connected to various ones of the taps for providing full wave rectification of at least two different voltages of different voltage magnitudes, and output filters connected to the rectifiers each including a series filter choke and a shunt filter capacitor, the improvement comprising:

said filter chokes comprising a single ferromagnetic core with a plurality of choke windings thereon, at least one of said choke windings having a different number of turns with respect to at least one other of said choke windings in the same ratio as the voltage of the output related to that choke winding bears to the voltage of the output related to the other of said choke windings.

2. A switching power supply comprising:
a power transformer having a primary winding and a secondary winding including a plurality of taps to divide said secondary winding into segments;
drive means for said transformer including means for providing currents of alternate polarity through said primary winding, thereby to produce at least two different voltages of alternating polarity in said secondary winding;
a plurality of rectifiers connected to the taps on said secondary winding in sets so as to provide full wave rectification of current induced in said secondary winding;
a plurality of voltage outputs of different voltage magnitudes, each including a shunt filter capacitor; and
inductive filter means comprising a single ferromagnetic core and a plurality of choke windings disposed on said single core, each of said windings connected in series from a related set of said rectifiers to a related one of said outputs,
each winding having a number of turns related to the number of turns of each other winding in the same ratio as the related output voltage magnitude bears to the output voltage magnitude of each other winding such that all of said choke windings have the same number of volts per turn, whereby said switching power supply comprises a plurality of outputs having different voltage magnitudes, each including a series filter choke wound on said common core.

3. A switching power supply comprising:
a power transformer having a primary winding and a secondary winding with a grounded center tap and at least two other taps on either side of the center tap for providing currents of opposite polarity with respect to ground in response to alternate polarity of current in said primary, said taps being arranged in a plurality of pairs so as to permit provision of different voltages;
drive means for said transformer including means for providing currents of alternate polarity through said primary winding, thereby to produce at least two different voltages of alternating polarity in said secondary winding;
a plurality of voltage outputs, each of said voltage outputs having a shunt filter capacitor;
output filter choke means including a single core of ferromagnetic material and a plurality of independent filter choke windings thereon, each of said filter choke windings connected to a corresponding one of said voltage outputs, each of said filter choke winding having a number of turns related to the number of turns of each other choke winding in the same ratio as the voltage of the voltage output corresponding to each choke bears to the voltage corresponding each other choke such that all of said choke windings have the same number of volts per turn; and
a plurality of rectifiers, each of said rectifiers connected from one of said taps to one of said choke windings, said rectifiers arranged in sets with corresponding taps of said secondary winding, each set connected to the same one of said choke windings, each of the rectifiers in a set poled to conduct current through the related choke in the same polarity as the other rectifier in the set.

4. A switching power supply comprising:
a power transformer having a primary winding and a secondary winding including a plurality of taps to divide said secondary winding into segments;
drive means for said transformer including means for providing currents of alternate polarity through said primary winding, thereby to produce at least two different voltages of alternating polarity in said secondary winding;
a plurality of first rectifiers connected to the taps on said secondary winding in sets so as to provide full wave rectification of current induced in said secondary winding;
at least one second rectifier connected to the center tap of said secondary winding;
a plurality of voltage outputs, each including a shunt filter capacitor; and
inductive filter means comprising a single ferromagnetic core and a plurality of choke windings disposed on said single core, each of said windings connected in series from a related set of said first rectifiers or from one of said second rectifiers to a related one of said outputs, each filter choke winding having a number of turns related to the number of turns of each other choke winding in the same ratio as the output voltage of each choke bears to the output voltage of each other choke such that all of said choke windings have the same number of volts per turn, whereby said switching power supply comprises a plurality of different voltage outputs, each including a series filter choke wound on said common core, less than all driven by said transformer, at least one driven by the filter choke of another.

5. A switching power supply comprising:
a power transformer having a primary winding and a secondary winding with a grounded center tap and at least two other taps, one on either side of the center tap, for providing currents of opposite polarity with respect to ground in response to alternate polarity of current in said primary;
drive means for said transformer including means for providing currents of alternate polarity through said primary winding, thereby to produce at least one voltage of alternating polarity in said secondary winding;
a pluralilty of voltage outputs, each of said voltage outputs having a shunt filter capacitor;
output filter choke means including a single core of ferromagnetic material and a plurality of independent filter choke windings thereon, each of said choke windings connected to a corresponding one of said voltage outputs, each filter choke winding have a number of turns related to the number of turns of each other choke winding in the same ratio as the output voltages of each choke winding bears to the output voltage of each other choke winding such that all of said choke windings have the same number of volts per turn;

at least one pair of first rectifiers, each retifier in a pair connected from a different one of said taps to the same one of said choke windings, each choke winding connected to no more than one pair, both rectifiers in a pair poled to conduct current through the related choke winding in the same polarity; and at least one second rectifier connected from ground to at least one other choke winding.

* * * * *